(12) United States Patent
Bronstein et al.

(10) Patent No.: US 12,134,249 B2
(45) Date of Patent: Nov. 5, 2024

(54) GLAZING HAVING AN AREA FOR COLLECTION OF INFORMATION

(71) Applicant: ACR II GLASS AMERICA INC., Nashville, TN (US)

(72) Inventors: Wladislaw Bronstein, Konz (DE); Markus Walter Pohlen, Mückeln (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 18/199,200

(22) Filed: May 18, 2023

(65) Prior Publication Data
US 2023/0373194 A1 Nov. 23, 2023

Related U.S. Application Data

(60) Provisional application No. 63/343,319, filed on May 18, 2022.

(51) Int. Cl.
*B32B 17/10* (2006.01)

(52) U.S. Cl.
CPC .. *B32B 17/10339* (2013.01); *B32B 17/10036* (2013.01); *B32B 17/10761* (2013.01); *B32B 2307/41* (2013.01); *B32B 2307/7376* (2023.05)

(58) Field of Classification Search
CPC ........ B32B 17/10339; B32B 17/10036; B32B 17/10761; B32B 2307/41; B32B 2307/7376
USPC .......................................................... 428/203
See application file for complete search history.

(56) References Cited

U.S. PATENT DOCUMENTS

| | | | | |
|---|---|---|---|---|
| 2004/0028953 A1* | 2/2004 | Kraemling | ........ | B32B 17/10036 428/697 |
| 2004/0234735 A1* | 11/2004 | Reynolds | ............ | B32B 17/1077 156/100 |
| 2005/0118401 A1* | 6/2005 | Smith | .................. | B41M 7/0081 428/201 |
| 2006/0081581 A1* | 4/2006 | Odeh | ................ | B32B 17/10761 219/203 |
| 2009/0098354 A1* | 4/2009 | Torr | .................... | B32B 17/1011 428/215 |
| 2014/0192392 A1* | 7/2014 | Cammenga | ............ | G02B 5/205 359/265 |
| 2020/0290319 A1* | 9/2020 | Mannheim Astete | ..... | B60J 1/00 |

* cited by examiner

*Primary Examiner* — Betelhem Shewareged
(74) *Attorney, Agent, or Firm* — K&L Gates LLP; Shu Chen

(57) ABSTRACT

A laminated glazing, comprising: a first glass sheet; a first interlayer; a second interlayer; and a second glass sheet. At least a portion of the second interlayer includes a first opaque print, the first opaque print partially surrounds a window for collection of information of the laminated glazing, and an edge of the second interlayer is positioned at a selected distance from an edge of the window for collection of information.

17 Claims, 1 Drawing Sheet

GLAZING HAVING AN AREA FOR COLLECTION OF INFORMATION

CROSS REFERENCE TO RELATED APPLICATION

The application claims priority to U.S. Provisional Patent Application No. 63/343,319, filed on May 18, 2022, entitled "GLAZING HAVING AN AREA FOR COLLECTION OF INFORMATION," the content of which is incorporated by reference herein in its entirety.

TECHNICAL FIELD

The present disclosure is generally related to a glazing having an area through which at least one sensor may be configured to collect information regarding a surrounding environment of e.g., a vehicle.

BACKGROUND

Information acquisition systems for autonomous driving function in vehicles, including cameras and other sensors are commonly mounted behind a glazing of a vehicle. They require a glazing with minimal optical distortion in an area through which an information acquisition system may collect data relating to a surrounding environment, or a window for collection of information. The window for collection of information is typically surrounded by an opaque black print for straylight reduction. An opaque print on a glass sheet of a laminated glazing of a vehicle may cause optical distortion in an area around the opaque print. The opaque print is typically applied to the glass sheet prior to bending of the glass. During bending, there may be a local difference in heat absorption caused by the opaque print which may cause distortion in areas of the glass adjacent to the opaque print.

SUMMARY

In one aspect, the present disclosure generally relates to a laminated glazing, comprising: a first glass sheet; a first interlayer; a second interlayer; and a second glass sheet. At least a portion of the second interlayer includes a first opaque print, the first opaque print surrounds a window for collection of information of the laminated glazing, and an edge of the second interlayer is positioned at a selected distance from an edge of the window for collection of information.

In an embodiment, the edge of the second interlayer is at least 30 mm from the edge of the window for collection of information. In another embodiment, the edge of the second interlayer is at least 35 mm from the edge of the window for collection of information. In yet another embodiment, the edge of the second interlayer is at least 70 mm from the edge of the window for collection of information.

In certain embodiments, the first opaque print does not reach an entire edge of the second interlayer. Further, the second interlayer may be positioned between the first interlayer and the first glass sheet.

According to an embodiment, each of the first and second glass sheets of the laminated glazing of the present disclosure may be from 1.0 mm to 2.5 mm thick. In a preferred embodiment, each glass sheet may be from 1.6 mm to 2.3 mm thick.

In one aspect, horizontal optical distortion in the window for collection of information may be less than 120 mdpt, preferably, less than 100 mdpt, or even more preferably, less than 80 mdpt. In another embodiment, the laminated glazing of the present disclosure may include a second opaque print on at least one of the first glass sheet and the second glass sheet.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
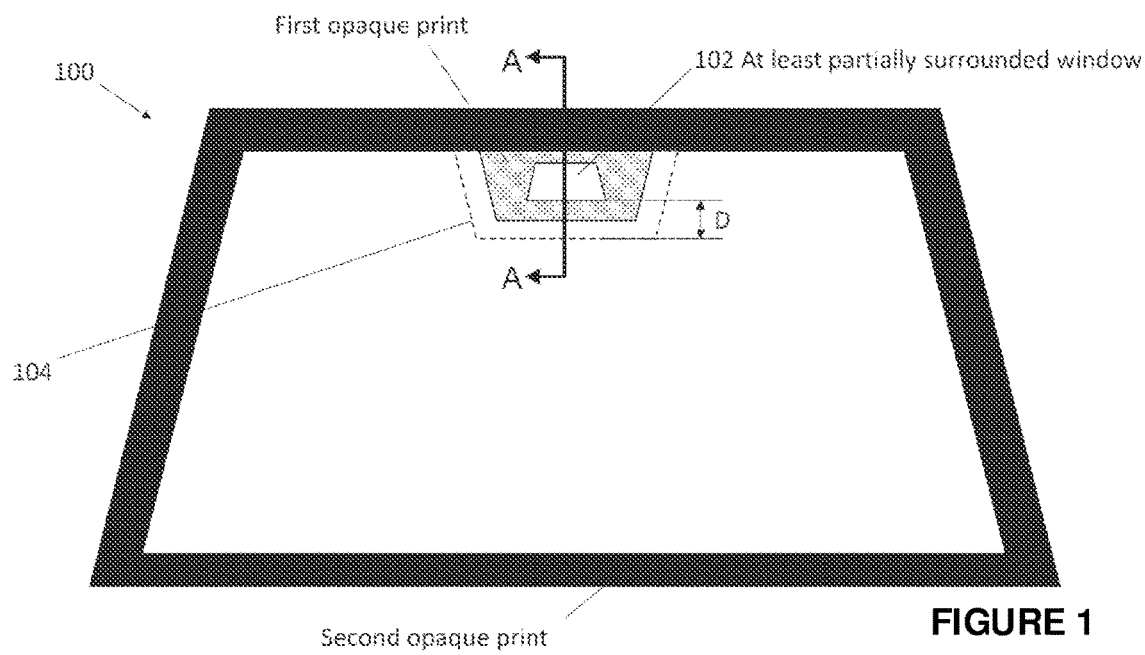
FIG. 1 illustrates a glazing, according to an embodiment of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Figure 2:
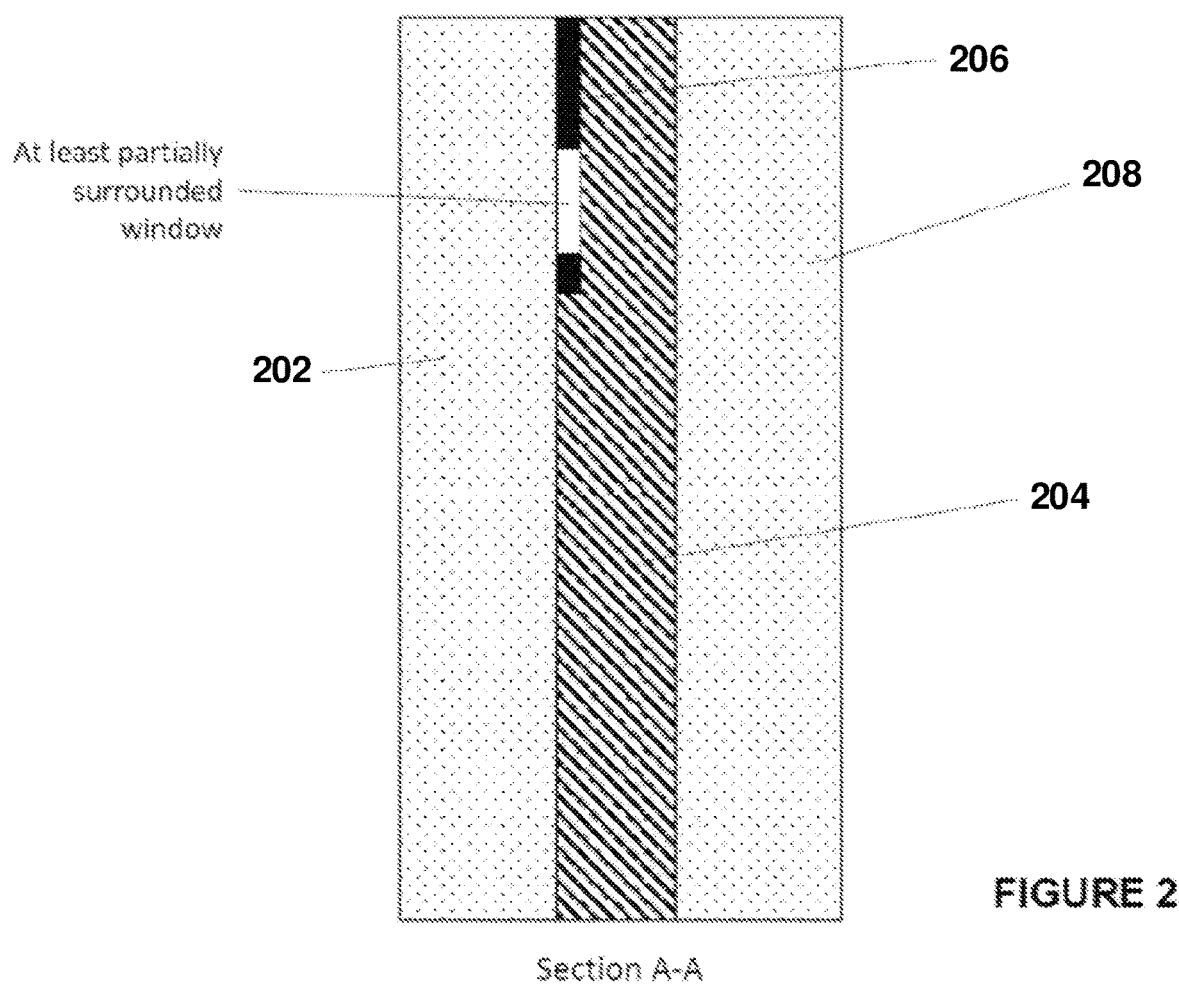
FIG. 2 illustrates a cross section of a glazing, according to an embodiment of the present disclosure.

According to the present disclosure, as will be described fully below with respect to FIGS. 1 and 2, an opaque print may be provided on an interlayer laminated between glass sheets of a glazing. In one aspect, such an interlayer may include an opaque print configured to provide a frame around an information acquisition system viewing area of e.g., a vehicle. The opaque print may be applied to a side of the interlayer. In a laminated glazing (e.g., laminated glazing 100 of FIG. 1), the printed interlayer may be laminated with another interlayer. In one embodiment, the printed interlayer may be provided in a size smaller than the other interlayer. As shown in FIG. 2, a laminated construction may include a first glass sheet 202, a first full size interlayer 204, a second interlayer with an opaque print 206, and a second glass sheet 208. The first and second interlayers 204, 206 may be the same base material, which may preferably be polyvinyl butyral. The second interlayer 206 may be laminated between the first interlayer 204 and the first glass sheet 202. In some embodiments, the second interlayer 206 may be laminated between the first interlayer 204 and the second glass sheet 208. The opaque print on the second interlayer 206 may face the first interlayer 204 when laminated in the glazing.

In accordance with aspects of the present disclosure, the second interlayer 206 with an opaque print may preferably be thinner than the first interlayer 204. In one embodiment, the second interlayer 206 may have a thickness of from 20

μm to 50 μm. Preferably, the second interlay is thin to avoid distortion in the laminated glazing caused by a change in thickness at the edge of the second interlayer 206. Distortion may occur when there is a step-change in thickness in the interlayers 204, 206 between glass sheets 202, 208. Such distortion may be located in the vicinity of the thickness step and may decrease with distance from the step location. Such distortion may interfere with an information acquisition system installed within a vehicle when the edge of the second interlayer 104 (i.e., the second interlayer 206 in FIG. 2) is close to a window for collecting information 102 shown in FIG. 1. For example, the second interlayer 104, 206 may preferably have a size such that the edge of the second interlayer 104 is a distance from the information acquisition system window 102 to minimize distortion in the window 102. The distance between the edge of the second interlayer 104 and the information acquisition system window 102 is shown as "D" in FIG. 1.

In accordance with aspects of the present disclosure, the distance D may depend on various factors, including the thickness of the glass sheets 202, 208. The greater the thickness of the first and second glass sheets 202, 208, the greater distance D may be required. As the glass sheets 202, 208 thicken, their flexibility may decrease which provides for a more gradual step-change in thickness at the edge of the second interlayer 104, 206. Thus, optical distortion caused by the change in thickness at the edge of the second interlayer 104, 206 may extend further from the edge of the second interlayer 104, 206 with thicker glass sheets 202, 208. For example, where the glass sheets 202, 208 are 1.1 mm each, a laminated second interlayer 104, 206 may extend so that the edge of the second interlayer 104, 206 is at least 30 mm from the window for collection of information, more preferably, at least 35 mm. Where the glass sheets 202, 208 are 2.1 mm thick each, the second interlayer 104, 206 may preferably extend at least 70 mm outside of the window for collection of information 102. Preferably, the first and second glass sheets 202, 208 may each have a thickness of 1.0 mm to 2.5 mm, more preferably 1.6 mm to 2.3 mm. The distance between the edge of the second interlayer 104, 206 and the edge of the window for collection of information 102 may be at least 30 mm, at least 50 mm, or at least 70 mm in some embodiments of the present disclosure. The distance between the edge of the second interlayer 104, 206 and the edge of the window for collection of information 102 may be measured as the shortest distance between a point on the edge of the second interlayer and a point on the edge of the window for collection of information.

The laminated glazing may further include an opaque print on one or both glass sheets 202, 208. The opaque print on a glass sheet may include a border around the periphery of the glass sheet. The opaque print on the second interlayer 104, 206 may overlap or meet the glass opaque print so that there is no space between the opaque prints when viewed by an observer of the laminated glazing. In one embodiment, the glass opaque print may include a black enamel print.

The second interlayer opaque print may or may not extend to an edge of the second interlayer 104, 206. In some embodiments, at least a portion at the second interlayer edge may not include the opaque print, as shown in FIG. 1, where a portion of the second interlayer edge does not include the opaque print. The distance between the opaque print and the edge of the second interlayer 104, 206 may allow for a larger distance between the information acquisition system window and the second interlayer edge without increasing the opaque print area. The area of the opaque print may be enough to mask an information acquisition system installed in a vehicle. A larger opaque print may not be desired where it may interfere with or limit the view of a vehicle driver and/or passenger.

Optical distortion may be measured as defined in ECE-R43 (Regulation No 43 of the Economic Commission for Europe of the United Nations (UN/ECE)—Uniform provisions concerning the approval of safety glazing materials and their installation on vehicles). Further, optical power may be measured by using ISRA Labscan-Screen 2D inspection equipment. Optical filter settings may be 3/2/0, corresponding to a physical length of 2 mm. Suitable masking filter settings may also be applied such as 6/5/5/R. The optical distortion of the window for collection of information 102 may include an average optical distortion across the window for collection of information 102. In some embodiments, the optical distortion of the window for collection of information 102 may be an absolute minimum, or the absolute value of the minimum, optical distortion in the window for collection of information 102.

Horizontal optical distortion may be defined as the distortion arousing from vertically directed beam deviations, as for example from horizontally aligned cylindrical lenses. Optical distortion may be measured in millidiopters (mdpt). The horizontal optical distortion in the window for collection of information 102 may be preferably less than 120 mdpt, more preferably less than 100 mdpt, and even more preferably less than 80 mdpt.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Insofar as the description above and the accompanying drawings disclose any additional subject matter that is not within the scope of the claims presented herein, the present disclosure is not dedicated to the public and the right to file one or more applications to claim such additional inventions is reserved. Further, although narrow claims are presented, it should be recognized that the scope of this (or these) inventions is much broader than presented by the current claims. It is intended that broader claims will be submitted in an application that claims the benefit of priority from this application upon conversion.

The invention claimed is:
1. A laminated glazing, comprising:
   a first glass sheet;
   a first interlayer;
   a second interlayer; and
   a second glass sheet;
   wherein at least a portion of the second interlayer includes
      a first opaque print, the first opaque print partially surrounds an area created on the laminated glazing through which at least one sensor mounted behind the laminated glazing inside a vehicle is configured to collect information regarding surrounding environment of the vehicle, and an edge of the second interlayer is positioned at a selected distance from an edge of the area, wherein the first interlayer has a first thickness, the second interlayer has a second thickness, and the first thickness is greater than the second thickness, wherein the second thickness ranges from 20 µm to 50 µm, wherein the first opaque print does not reach an entire edge of the second interlayer.

2. The laminated glazing according to claim 1, wherein the edge of the second interlayer is at least 30 mm from the edge of the area.

3. The laminated glazing according to claim 1, wherein the edge of the second interlayer is at least 35 mm from the edge of the area.

4. The laminated glazing according to claim 1, wherein the edge of the second interlayer is at least 70 mm from the edge of the area.

5. The laminated glazing according to claim 1, wherein the second interlayer is positioned between the first interlayer and the first glass sheet.

6. The laminated glazing according to claim 1, wherein each of the first glass sheet and the second glass sheet is from 1.0 mm to 2.5 mm thick.

7. The laminated glazing according to claim 6, wherein each of the first glass sheet and the second glass sheet is from 1.6 mm to 2.3 mm thick.

8. The laminated glazing according to claim 1, wherein horizontal optical distortion in the area is less than 120 mdpt.

9. The laminated glazing according to claim 8, wherein the horizontal optical distortion in the area is less than 100 mdpt.

10. The laminated glazing according to claim 9, wherein the horizontal optical distortion in the area is less than 80 mdpt.

11. The laminated glazing according to claim 1, further comprising a second opaque print on at least one of the first glass sheet and the second glass sheet.

12. The laminated glazing according to claim 1, wherein the first opaque print includes a black enamel print.

13. A laminated glazing, comprising:
a first glass sheet;
a second glass sheet; and
a first interlayer laminated between the first and second glass sheets, wherein the first interlayer includes a second interlayer embedded therein, wherein the second interlayer has a thickness ranging from 20 µm to 50 µm, wherein the second interlayer includes an opaque print partially bordering an area created on the laminated glazing through which at least one camera installed within a vehicle is configured to collect information regarding surrounding environment of the vehicle, wherein an edge of the second interlayer is positioned at a selected distance from an edge of the area, wherein the opaque print does not reach an entire edge of the second interlayer.

14. The laminated glazing of claim 13, wherein the selected distance is determined as a shortest distance between two corresponding points on two adjacent edges of the second interlayer and the area.

15. The laminated glazing of claim 13, wherein the selected distance increases when at least one of the first and second glass sheets thickens.

16. The laminated glazing of claim 13, wherein the opaque print is applied at one side of the second interlayer.

17. The laminated glazing of claim 13, wherein the first interlayer has a same width and length as that of the first and second glass sheets.

* * * * *